(12) United States Patent
Crabtree et al.

(10) Patent No.: US 12,542,816 B2
(45) Date of Patent: Feb. 3, 2026

(54) COMPLEX IT PROCESS ANNOTATION, TRACING, ANALYSIS, AND SIMULATION

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 170 days.

(21) Appl. No.: 18/600,727

(22) Filed: Mar. 10, 2024

(65) Prior Publication Data
US 2024/0214429 A1 Jun. 27, 2024

Related U.S. Application Data

(63) Continuation of application No. 17/185,655, filed on Feb. 25, 2021, now Pat. No. 12,225,049, which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, (Continued)

(51) Int. Cl.
| | |
|---|---|
| H04L 9/40 | (2022.01) |
| G06F 9/50 | (2006.01) |
| G06F 16/2458 | (2019.01) |
| G06F 16/951 | (2019.01) |
| G06F 9/48 | (2006.01) |
| G06F 9/54 | (2006.01) |

(52) U.S. Cl.
CPC ............ *H04L 63/20* (2013.01); *G06F 9/5038* (2013.01); *G06F 16/2477* (2019.01); *G06F 16/951* (2019.01); *H04L 63/1425* (2013.01); *H04L 63/1441* (2013.01); *G06F 9/4881* (2013.01); *G06F 9/54* (2013.01)

(58) Field of Classification Search
CPC . H04L 63/20; H04L 63/1425; H04L 63/1441; G06F 16/2477; G06F 16/951; G06F 9/5038
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |

(Continued)

FOREIGN PATENT DOCUMENTS

| | | |
|---|---|---|
| WO | 2014159150 A1 | 10/2014 |
| WO | 2017075543 A1 | 5/2017 |

*Primary Examiner* — Oleg Korsak
(74) *Attorney, Agent, or Firm* — Galvin Patent Law LLC; Brian R. Galvin

(57) ABSTRACT

A system and method for complex IT process annotation and tracing, analysis, and simulation, comprising at least a generative simulation platform, optimization engine, and metric engine, which is able to model and simulate a variety of simulations and develop adaptive models, and can be used more specifically for IT/OT infrastructure and technology enabled process simulation to manage performance and risk in a network enabled business infrastructure, perform load-testing and quality control tests, and determine the overall health to known attacks and potential interruptions as a system or network or process topography changes and updates.

4 Claims, 11 Drawing Sheets

Related U.S. Application Data now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,575,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, said application No. 15/887,496 is a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/498,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(56) References Cited

U.S. PATENT DOCUMENTS

| | | |
|---|---|---|
| 7,072,863 B1 | 7/2006 | Phillips et al. |
| 7,818,224 B2 | 10/2010 | Boerner |
| 7,818,417 B2 | 10/2010 | Ginis et al. |
| 7,840,677 B2 | 11/2010 | Li et al. |
| 8,069,190 B2 | 11/2011 | Mccoll et al. |

(56) References Cited

U.S. PATENT DOCUMENTS

| | | |
|---|---|---|
| 9,338,061 B2 | 5/2016 | Chen et al. |
| 9,639,575 B2 | 5/2017 | Leida et al. |
| 10,168,691 B2 | 1/2019 | Zornio et al. |
| 10,735,456 B2 * | 8/2020 | Crabtree ............. H04L 63/1441 |
| 10,740,358 B2 | 8/2020 | Chan et al. |
| 12,206,707 B2 * | 1/2025 | Crabtree ............... G06F 16/951 |
| 2007/0021955 A1 | 1/2007 | Tolone et al. |
| 2007/0043656 A1 | 2/2007 | Lancaster |
| 2008/0027690 A1 | 1/2008 | Watts |
| 2008/0221949 A1 | 9/2008 | Delurgio et al. |
| 2009/0222562 A1 | 9/2009 | Liu et al. |
| 2011/0208681 A1 | 8/2011 | Kuecuekyan |
| 2012/0116743 A1 | 5/2012 | Ayala et al. |
| 2012/0266244 A1 | 10/2012 | Green et al. |
| 2013/0290554 A1 | 10/2013 | Chen et al. |
| 2014/0156806 A1 | 6/2014 | Karpistsenko et al. |
| 2014/0279762 A1 | 9/2014 | Xaypanya et al. |
| 2015/0149979 A1 | 5/2015 | Talby et al. |
| 2015/0169294 A1 | 6/2015 | Brock et al. |
| 2015/0186427 A1 | 7/2015 | Logothetis et al. |
| 2015/0379424 A1 | 12/2015 | Dirac et al. |
| 2016/0078361 A1 | 3/2016 | Brueckner et al. |
| 2016/0092557 A1 | 3/2016 | Stojanovic et al. |
| 2016/0164905 A1 | 6/2016 | Pinney Wood et al. |
| 2016/0275123 A1 | 9/2016 | Lin et al. |
| 2016/0364307 A1 | 12/2016 | Garg et al. |
| 2017/0006135 A1 | 1/2017 | Siebel et al. |
| 2017/0090893 A1 | 3/2017 | Aditya et al. |
| 2017/0193110 A1 | 7/2017 | Crabtree et al. |
| 2017/0323089 A1 | 11/2017 | Duggal et al. |
| 2018/0295154 A1 * | 10/2018 | Crabtree ............. H04L 63/1433 |
| 2020/0259866 A1 * | 8/2020 | Crabtree ............. G06F 16/2477 |
| 2020/0296137 A1 * | 9/2020 | Crabtree ............. H04L 63/1433 |
| 2021/0021644 A1 * | 1/2021 | Crabtree ............... G06F 16/951 |
| 2022/0014561 A1 * | 1/2022 | Caceres ................ G06F 16/951 |
| 2022/0053013 A1 * | 2/2022 | Crabtree ............. H04L 63/1433 |
| 2022/0060497 A1 * | 2/2022 | Crabtree ................ G06N 20/00 |
| 2023/0118388 A1 * | 4/2023 | Crabtree ............. H04L 63/123 726/23 |
| 2023/0283641 A1 * | 9/2023 | Crabtree ............. H04L 63/1441 726/22 |
| 2023/0370490 A1 * | 11/2023 | Crabtree ............. H04L 63/1433 |
| 2023/0370491 A1 * | 11/2023 | Crabtree ................ G06N 3/098 |
| 2023/0412620 A1 * | 12/2023 | Crabtree ............. H04L 63/1416 |

* cited by examiner

COMPLEX IT PROCESS ANNOTATION, TRACING, ANALYSIS, AND SIMULATION

CROSS-REFERENCE TO RELATED APPLICATIONS

Priority is claimed in the application data sheet to the following patents or patent applications, each of which is expressly incorporated herein by reference in its entirety:
Ser. No. 17/185,655
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
Ser. No. 62/568,312
Ser. No. 15/616,427
Ser. No. 14/925,974
Ser. No. 62/568,305
Ser. No. 62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
Ser. No. 62/568,291
Ser. No. 62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368

BACKGROUND OF THE INVENTION

Field of the Art

The disclosure relates to the field of digital simulations, specifically the field of annotation, tracing, analysis, and simulation of complex IT networks using a generative simulation model.

Discussion of the State of the Art

It is currently the case that there exists no comprehensive, adaptive, dynamic graphing process to graph a complex information technology (IT) infrastructure, such as the large networks and facilities operated by the Department of Defense, which rely on ad-hoc solutions to cyber defense solutions. There exists no current comprehensive, systematic, principle-based modeling and simulation system for cyber-defense and IT safety and criticality testing. This has resulted in stagnation of cyber defense efforts and significantly increased the manpower and financial cost of current cyber-defense efforts, while efforts to penetrate and exploit cyber-physical and computer systems progress rapidly in comparison. Documents published by the US Army Research Laboratory have called for such a system that uses a model-driven paradigm for simulation purposes to increase cyber-security capabilities. A comprehensive model-driven approach is not limited to government uses, however, and would also allow private corporations to optimize and fine-tune their infrastructure in response to various inputs, challenges, or attacks, resulting in potentially more optimized infrastructure and organizational technology for firms utilizing information technology well into the future.

What is needed is a system and method for complex IT process annotation and tracing, analysis, and simulation.

SUMMARY OF THE INVENTION

Accordingly, the inventor has conceived and reduced to practice, in a preferred embodiment of the invention, a system and methods for complex IT process annotation and tracing, analysis, and simulation using a generative simulation model. The following non-limiting summary of the invention is provided for clarity, and should be construed consistently with embodiments described in the detailed description below.

To solve the problem of a lack of comprehensive and adaptive IT infrastructure analysis and cyber-defense graphing, a system has been devised for complex IT process annotation and tracing, analysis, and simulation, comprising: a generative simulation platform comprising at least a first plurality of programming instructions stored in a memory of, and operating on at least one processor of, a computing device, wherein the first plurality of programming instructions, when operating on the at least one processor, cause the computing device to: receive some combination of object, environment, or simulation data from a resource over a network; parse received data using pattern recognition; parametrize parsed data into objects for model building; and alter parameters or objects to simulate random or unknown events occurring; a directed computational graph comprising at least a second plurality of programming instructions stored in a memory of, and operating on at least one processor of, a computing device, wherein the second plurality of programming instructions, when operating on the at least one processor, cause the computing device to: retrieve the first and second datasets from the time series data retrieval and storage server; and comparatively analyze the first dataset against second dataset to determine an optimal model to use for predictive simulation; and a multidimensional time series datastore comprising at least a third plurality of programming instructions stored in a memory of, and operating on at least one processor of, a computing device, wherein the third plurality of programming instructions, when operating on the at least one processor, cause the computing device to: create a first dataset by retrieving from memory previously gathered and analyzed data based at least in part on a plurality of perils; and create a second dataset by retrieving from memory synthetically generated data based at least on the plurality of perils;

and a metric engine operating on a computing device comprising at least a fourth plurality of programming instructions stored in a memory of, and operating on at least one processor of, a computing device, wherein the fourth plurality of programming instructions, when operating on the at least one processor, cause the computing device to: determine and calculate a resilience metric for an IT infrastructure; determine and calculate a blast radius metric for an IT infrastructure; simulate attacks and interruptions on an IT infrastructure; normalize calculated metrics; prioritize metric scores for IT infrastructure health and safety; develop and calculate graphs for domain controllers in an IT infrastructure; and traverse network paths for additional infrastructure criticality simulations.

According to a preferred embodiment, a computing system for complex IT process annotation and tracing, analysis, and simulation employing a generative simulation platform, the computing system comprising: one or more hardware processors configured for: receiving time series data associated with a computer network, the time series data comprising system logs from one or more devices on the computer network; storing the time series data as a first dataset in a multidimensional time series; retrieving the first dataset from the multidimensional time series database; constructing a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes; selecting a user or user group represented as a node in the directed computational graph; generating a simulated attack on the model of the computer network by simulating a compromised password of the user or user group; storing a simulation result the simulation result comprising a list of nodes accessible using the compromised password; determining a blast radius comprising an extent to which the computer network would be compromised based on the list of nodes and their relationships to one another; identifying a plurality of paths between nodes within the blast radius; and calculating and report a resilience metric for the computer network, the resilience metric being based on a Monte-Carlo simulation within the blast radius to determine the worst-scoring relationships in the blast radius.

According to another preferred embodiment, a computer-implemented method executed on a generative simulation platform for complex IT process annotation and tracing, analysis, and simulation, the computer-implemented method comprising: receiving time series data associated with a computer network, the time series data comprising system logs from one or more devices on the computer network; storing the time series data as a first dataset in a multidimensional time series; retrieving the first dataset from the multidimensional time series database; constructing a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes; selecting a user or user group represented as a node in the directed computational graph; generating a simulated attack on the model of the computer network by simulating a compromised password of the user or user group; storing a simulation result the simulation result comprising a list of nodes accessible using the compromised password; determining a blast radius comprising an extent to which the computer network would be compromised based on the list of nodes and their relationships to one another; identifying a plurality of paths between nodes within the blast radius; and calculating and report a resilience metric for the computer network, the resilience metric being based on a Monte-Carlo simulation within the blast radius to determine the worst-scoring relationships in the blast radius.

According to another preferred embodiment, a system for complex IT process annotation and tracing, analysis, and simulation employing a generative simulation platform, comprising one or more computers with executable instructions that, when executed, cause the system to: receive time series data associated with a computer network, the time series data comprising system logs from one or more devices on the computer network; store the time series data as a first dataset in a multidimensional time series; retrieve the first dataset from the multidimensional time series database; construct a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes; select a user or user group represented as a node in the directed computational graph; generate a simulated attack on the model of the computer network by simulating a compromised password of the user or user group; store a simulation result the simulation result comprising a list of nodes accessible using the compromised password; determine a blast radius comprising an extent to which the computer network would be compromised based on the list of nodes and their relationships to one another; identify a plurality of paths between nodes within the blast radius; and calculate and report a resilience metric for the computer network, the resilience metric being based on a Monte-Carlo simulation within the blast radius to determine the worst-scoring relationships in the blast radius.

According to another preferred embodiment, non-transitory, computer-readable storage media having computer-executable instructions embodied thereon that, when executed by one or more processors of a computing system employing a generative simulation platform for complex IT process annotation and tracing, analysis, and simulation, cause the computing system to: receive time series data associated with a computer network, the time series data comprising system logs from one or more devices on the computer network; store the time series data as a first dataset in a multidimensional time series; retrieve the first dataset from the multidimensional time series database; construct a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes; select a user or user group represented as a node in the directed computational graph; generate a simulated attack on the model of the computer network by simulating a compromised password of the user or user group; store a simulation result the simulation result comprising a list of nodes accessible using the compromised password; determine a blast radius comprising an extent to which the computer network would be compromised based on the list of nodes and their relationships to one another; identify a plurality of paths between nodes within the blast radius; and calculate and report a resilience metric for the computer network, the resilience metric being based on a Monte-Carlo simulation within the blast radius to determine the worst-scoring relationships in the blast radius.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION OF THE INVENTION

Figure 1:
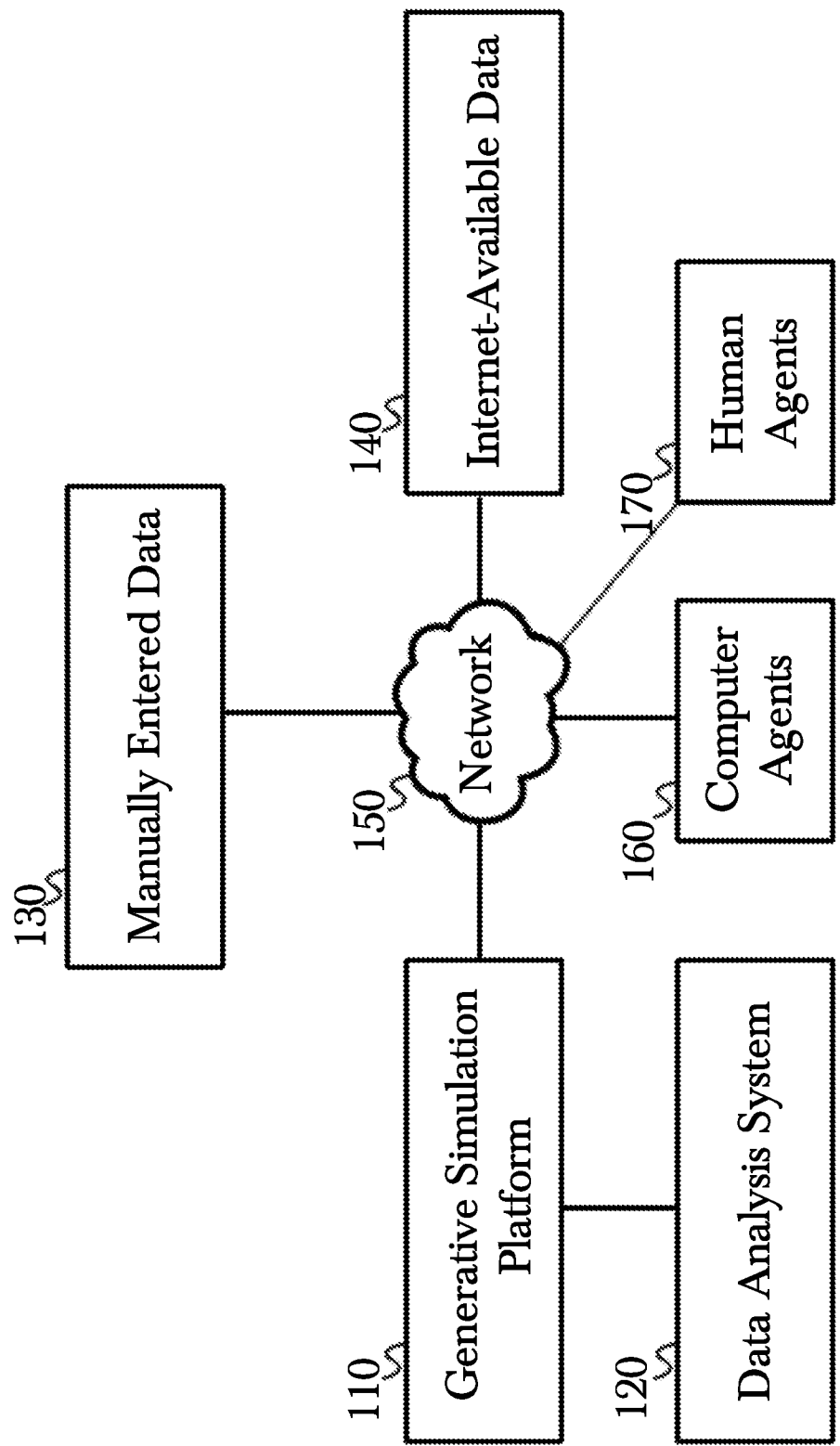
FIG. 1 is a system diagram showing high-level components in a generative simulation platform's operation.

The inventor has conceived, and reduced to practice, a system and method for complex IT process annotation and tracing, analysis, and simulation.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a system diagram showing high-level components in a generative simulation platform's 110 operation, according to a preferred aspect. A generative simulation platform 110 exists as a specific computer system, a computer system's minimal components and functionality being described in FIGS. 10-13, and which operates a data analysis system 120. A data analysis system may mean in this context any operating system which meets the description and specification of FIG. 2, and may be used to run advanced and dynamic simulations based on a plurality of models at a user's discretion, utilizing multidimensional time-series datastores 220 and a directed computational graph module 255 to monitor and allow analysis of the results of ongoing simulations as they change over time. Such simulations may include analyzing the spread, contamination, destruction of, or mutation of a pathogen, as outlined in FIG. 7, or may be simulations of complex engineering problems such as described in both FIG. 8 and FIG. 9, including problems related to networking and list problems as described in FIG. 9. The generative simulation platform 110 and data analysis system 120 which operate on the platform 110 are not limited by the context or content of a simulation and may be configured to run any number of complex or large-scale simulations as needed. A generative simulation platform 110 is connected to a network 150, which may allow manually entered data remotely 130 as well as data acquired over the internet 140 such as publicly available data or data accessed over a database. An example of internet-available data 140 may include a weather forecasting database, allowing a simulation to query real-world data as it becomes available, or allowing for the pre-loading of such data, or data from a web page or other web service, and developing a model to simulate without taking further real-world data in as the simulation runs. Computer agents 160 may be used to automatically interact with the simulations of an IT infrastructure, and human agents 170 may also be used to interact, either simultaneously, or separately. Both types of agents operate over a network 150 to interact with a generative simulation platform 110.

Figure 2:
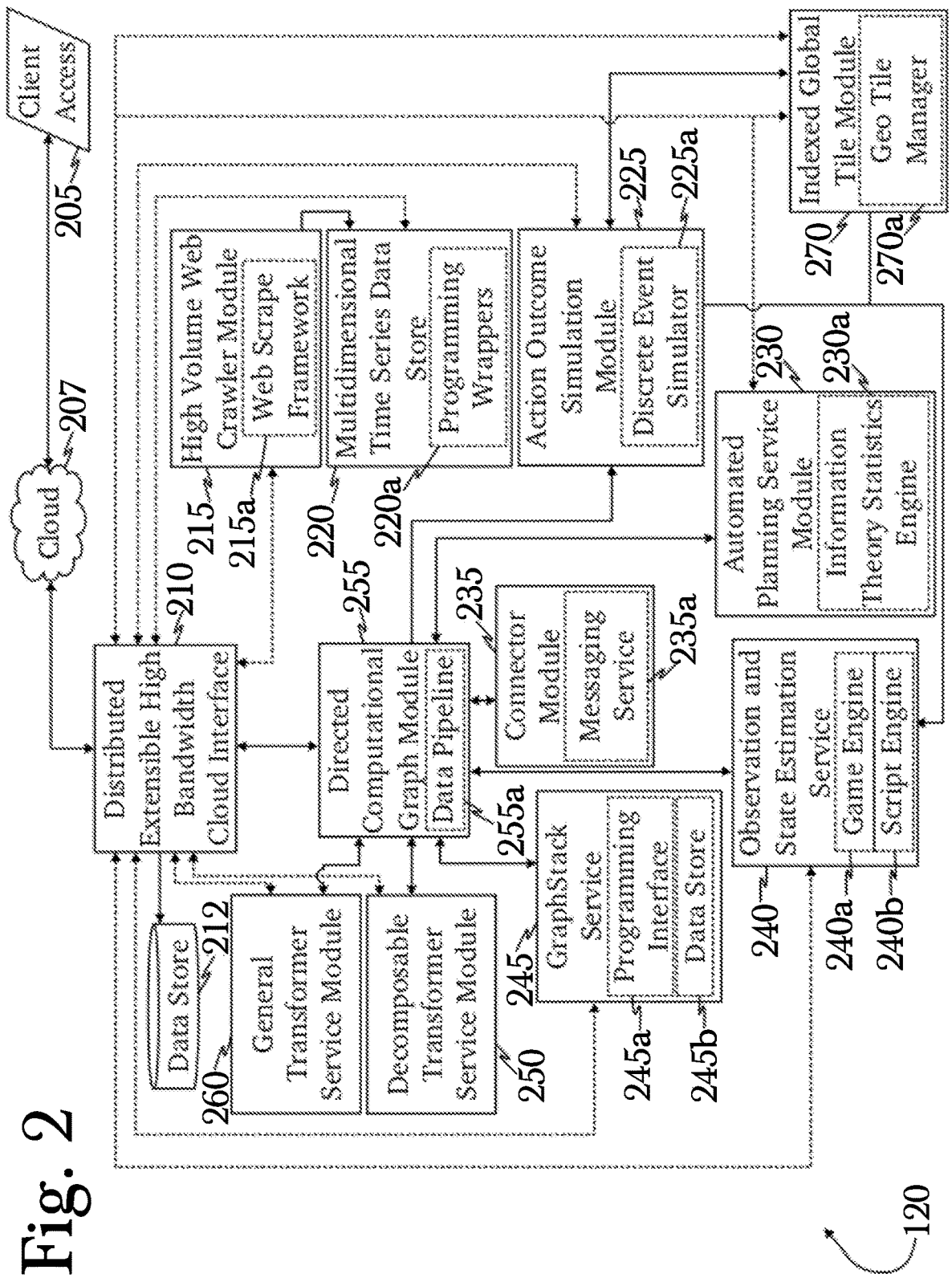
FIG. 2 is a diagram of an exemplary architecture of a data analysis system according to an aspect of an embodiment.

FIG. 2 is a diagram of an exemplary architecture of a data analysis system 120 according to an embodiment of the invention. Client access to system 205 for specific data entry, system control and for interaction with system output such as automated predictive decision making and planning and alternate pathway simulations, occurs through the system's distributed, extensible high bandwidth cloud interface 210 which uses a versatile, robust web application driven interface for both input and display of client-facing information and a data store 212 such as, but not limited to MONGODB™, COUCHDB™, CASSANDRA™ or REDIS™ depending on the embodiment. Much of the business data analyzed by the system both from sources within the confines of the client business, and from cloud based sources 207, public or proprietary such as, but not limited to: subscribed business field specific data services, external remote sensors, subscribed satellite image and data feeds and web sites of interest to business operations both general and field specific, also enter the system through the cloud interface 210, data being passed to the connector module 235 which may possess the API routines 235a needed to accept and convert the external data and then pass the normalized information to other analysis and transformation components of the system, the directed computational graph module 255, high volume web crawler module 215, multi-dimensional time series database 220 and a graph stack service 245. Directed computational graph module 255 retrieves one or more streams of data from a plurality of sources, which includes, but is not limited to, a plurality of physical sensors, network service providers, web-based questionnaires and surveys, monitoring of electronic infrastructure, crowd sourcing campaigns, and human input device information. Within directed computational graph module 255, data may be split into two identical streams in a specialized pre-programmed data pipeline 255a, wherein one sub-stream may be sent for batch processing and storage while the other sub-stream may be reformatted for transformation pipeline analysis. The data may be then transferred to a general transformer service module 260 for linear data transformation as part of analysis or the decomposable transformer service module 250 for branching or iterative transformations that are part of analysis. Directed computational graph module 255 represents all data as directed graphs where the transformations are nodes and the result messages between transformations edges of the graph. High-volume web crawling module 215 may use multiple server hosted preprogrammed web spiders which, while autonomously configured, may be deployed within a web scraping framework 215a of which SCRAPY™ is an example, to identify and retrieve data of interest from web-based sources that are not well tagged by conventional web crawling technology. Multiple dimension time series data store module 220 may receive streaming data from a large plurality of sensors that may be of several different types. Multiple dimension time series data store module 220 may also store any time series data encountered by system 120 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 220 may accommodate irregular and high-volume surges by dynamically allotting network bandwidth and server processing channels to process the incoming data. Inclusion of programming wrappers 220a for languages—examples of which may include, but are not limited to, C++, PERL, PYTHON, and ERLANG™—allows sophisticated programming logic to be added to default functions of multidimensional time series database 220 without intimate knowledge of the core programming, greatly extending breadth of function. Data retrieved by multidimensional time series database 220 and high-volume web crawling module 215 may be further analyzed and transformed into task-optimized results by directed computational graph 255 and associated general transformer service 260 and decomposable transformer service 250 modules. Alternately, data from the multidimensional time series database and high-volume web crawling modules may be sent, often with scripted cuing information determining important vertices 245a, to graph stack service module 245 which, employing standardized protocols for converting streams of information into graph representations of that data, for example open graph internet technology (although the invention is not reliant on any one standard). Through the steps, graph stack service module 245 represents data in graphical form influenced by any pre-determined scripted modifications 245a and stores it in a graph-based data store 245b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 230, which also runs powerful information theory-based predictive statistics functions and machine learning algorithms 230a to allow future trends and outcomes to be rapidly forecast based upon the current system derived results and choosing each a plurality of possible business decisions. Then, using all or most available data, automated planning service module 230 may propose business decisions most likely to result in favorable business outcomes with a usably high level of certainty. Closely related to the automated planning service module 230 in the use of system-derived results in conjunction with possible externally supplied additional information in the assistance of end user business decision making, action outcome simulation module 225 with a discrete event simulator programming module 225a coupled with an end user-facing observation and state estimation service 240, which is highly scriptable 240b as circumstances require and has a game engine 240a to more realistically stage possible outcomes of business decisions under consideration, allows business decision makers to investigate the probable outcomes of choosing one pending course of action over another based upon analysis of the current available data.

A significant proportion of the data that is retrieved and transformed by the data analysis system, both in real world analyses and as predictive simulations that build upon intelligent extrapolations of real world data, may include a geospatial component. The indexed global tile module 270 and its associated geo tile manager 270a may manage externally available, standardized geospatial tiles and may enable other components of the data analysis system, through programming methods, to access and manipulate meta-information associated with geospatial tiles and stored by the system. The data analysis system may manipulate this component over the time frame of an analysis and potentially beyond such that, in addition to other discriminators, the data is also tagged, or indexed, with their coordinates of origin on the globe. This may allow the system to better integrate and store analysis specific information with all available information within the same geographical region. Such ability makes possible not only another layer of transformative capability, but may greatly augment presentation of data by anchoring to geographic images including satellite imagery and superimposed maps both during presentation of real world data and simulation runs.

Figure 3:
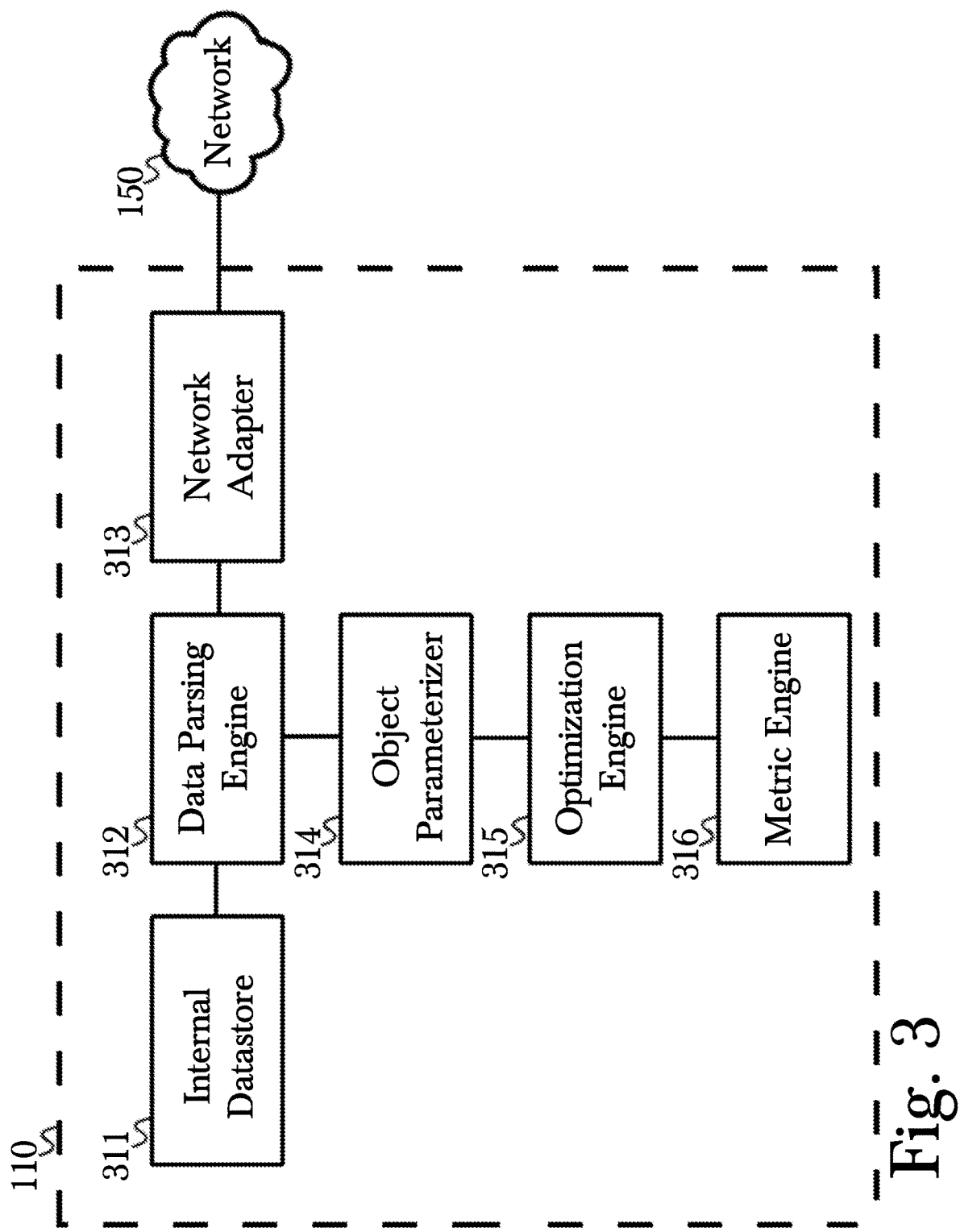
FIG. 3 is a system diagram illustrating components interior to a generative simulation platform.

FIG. 3 is a system diagram illustrating components interior to a generative simulation platform, according to an embodiment. An internal datastore 311 is present in a generative simulation platform 110, which may store data entered manually 130 or data gathered from the internet 140, which first must be gathered from a network adapter 313. A network adapter 313 connects the computer system to a network 150, which may be the internet, a local intranet, or some other network 150, and may forward data to a data parsing engine 312 which will separate desired data from "junk" or otherwise extraneous data using tools such as regular expressions and other pattern matching techniques. Examples of extraneous data include the formatting of a web page, while examples of desired data may include, for example, historical weather data in an area, if a model is being constructed for weather conditions in an area. A data parsing engine 312 then forwards data to both an internal datastore 311 to be stored for any future purposes, while data is also forwarded to an object parameterizer 314. An object parameterizer 314 takes filtered or parsed data from a data parser 312, and constructs coherent "objects" as they are known in computer software development. In this way, for example, an object could be created that represents an individual person in a model of a population of people, for a simulation of a pathogen outbreak. Data may be gathered from manual entry 130 from some tool or file written to produce data and give it to the platform 110, rather than located from an unrelated source over a network 150. An object in this context may be a "person," and may have data fields such as a binary value "infected," a string "name" if necessary, an integer "age," another integer "condition" to represent conditions such as AIDS or other conditions which may alter the individual's susceptibility to the examined pathogen, and a further included data field could include "days_in_public" to represent how often they go into public and therefore may spread the pathogen to others. In this example, as data is fed to an object parameterizer 314, many of these objects are made until no more object data is provided. Objects and un-parametrized data (if any) are then sent to an optimization engine 315, which may "freeze" certain objects or parameters of objects, or classes of objects or classes of parameters across multiple objects, from changing, during a simulation. An optimization engine 315 can also induce certain specific or deterministic changes in fields or objects during a simulation, or at the beginning of a simulation to compare with earlier simulated results, to locate key factors in altering the outcome of a simulation, which may, for example, be the state of a population's infection with a pathogen after 180 days. In this way, the system can be used to alter specific data fields and objects in a simulation from a base model, or prevent certain fields from changing during simulation runtime, to allow researchers to locate novel ways to achieve desired outcomes, for example the eradication of a pathogen from a population after 180 days. Researchers can also focus further experiments and simulations on results that were closer to a desired goal, for example if changing a few key variables resulted in significantly lower infection rates in a population than before, they may now direct their research to those variables. A metric engine 316 is connected to the optimization engine 315, which, after simulations have been run and optimized by other components in a generative simulation platform 110, uses these models and simulations to develop various metrics of infrastructure health and failure criticality using methods outlined in FIG. 5, 6, and FIG. 7, analyzing individual "nodes" or "vertices" representing systems, users, user groups, or system properties that affect multiple other nodes, to determine their relationships and consequentially their relationships and affects with other vertices when evaluating the graph's metric for attack resilience.

Figure 4:
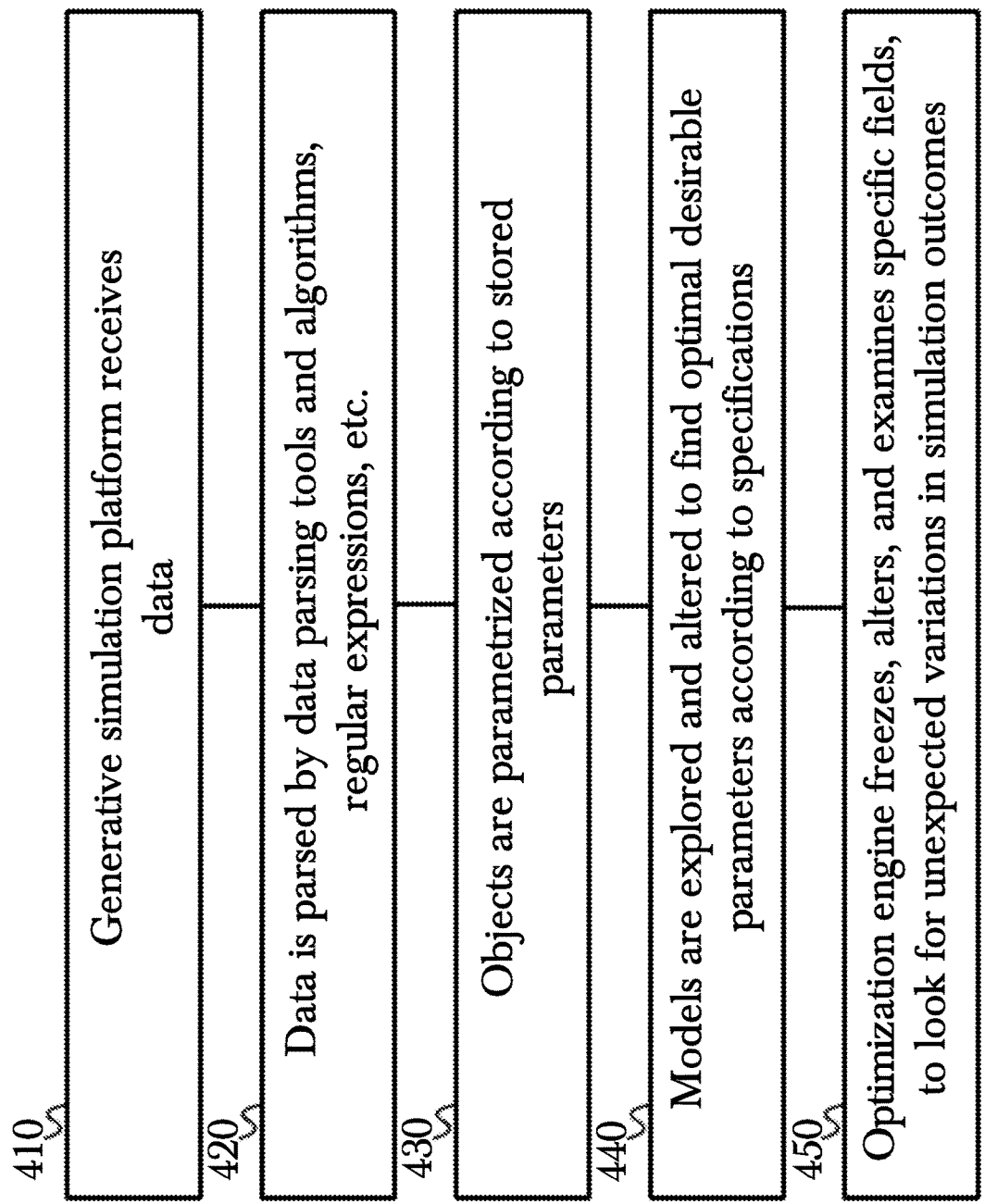
FIG. 4 is a method diagram illustrating high level steps in the operation of a multi-model generative simulation system.

FIG. 4 is a method diagram illustrating high level steps in the operation of a multi-model generative simulation system, according to a preferred aspect. First, a platform 110 must receive data 410, which may be accomplished manually 130 or through network-available data 140 which may not be specifically prepared for the system, but is nonetheless available to be used, via a network adapter 313. Data may then be parsed 420 using a data parsing engine 312, which may utilize common tools such as regular expressions and string queries such as LINQ™, to find desired data amidst whatever data may be supplied, which may either be hand-picked manually 130 or retrieved automatically from a network resource 140 such as an internet-enabled website or other webservice. Once data is parsed 420, objects are parametrized 430 according to whatever stored parameters are contained in internal storage 311, utilizing an object parameterizer 314. An object parameterizer 314 acting in this way may, as discussed above in FIG. 3, create "objects" for a model to be simulated, such as individual people, or even corporations and stocks if utilizing the system for financial simulations and risk assessment. Objects may be instantiated and parametrized 430 for a simulation model, before simulations are run using the established models and explored to find optimal parameters according to specifications 440 which may include, for example, ending a simulation of pathogen spread and eradication if the population infection rate reaches 30%, or 0%, indicating either widespread infection or total eradication of the virus. Another possible simulation and outcome parameter may be risk assessment of financial actors, to examine the risk of a market given certain parameters and environmental data to be parametrized 430, and the simulation specified to end if risk assessment reaches a certain threshold, whether low or high, to find low-risk strategies and avoid high-risk ones. An optimization engine 315 may be used to perform optimization functions on a running simulation 450 by "freezing" or otherwise preventing certain parameters or objects from being changed, or artificially changing certain parameters or objects ex nihilo so as to see the reaction of the simulated model to unexpected or unpredicted changes. In this way, unknown changes or unpredictable changes can be simulated, as well as attempts to isolate parameters, in an effort to find alternative methods to bring about a desirable outcome, thereby helping direct future experiments.

Figure 5:
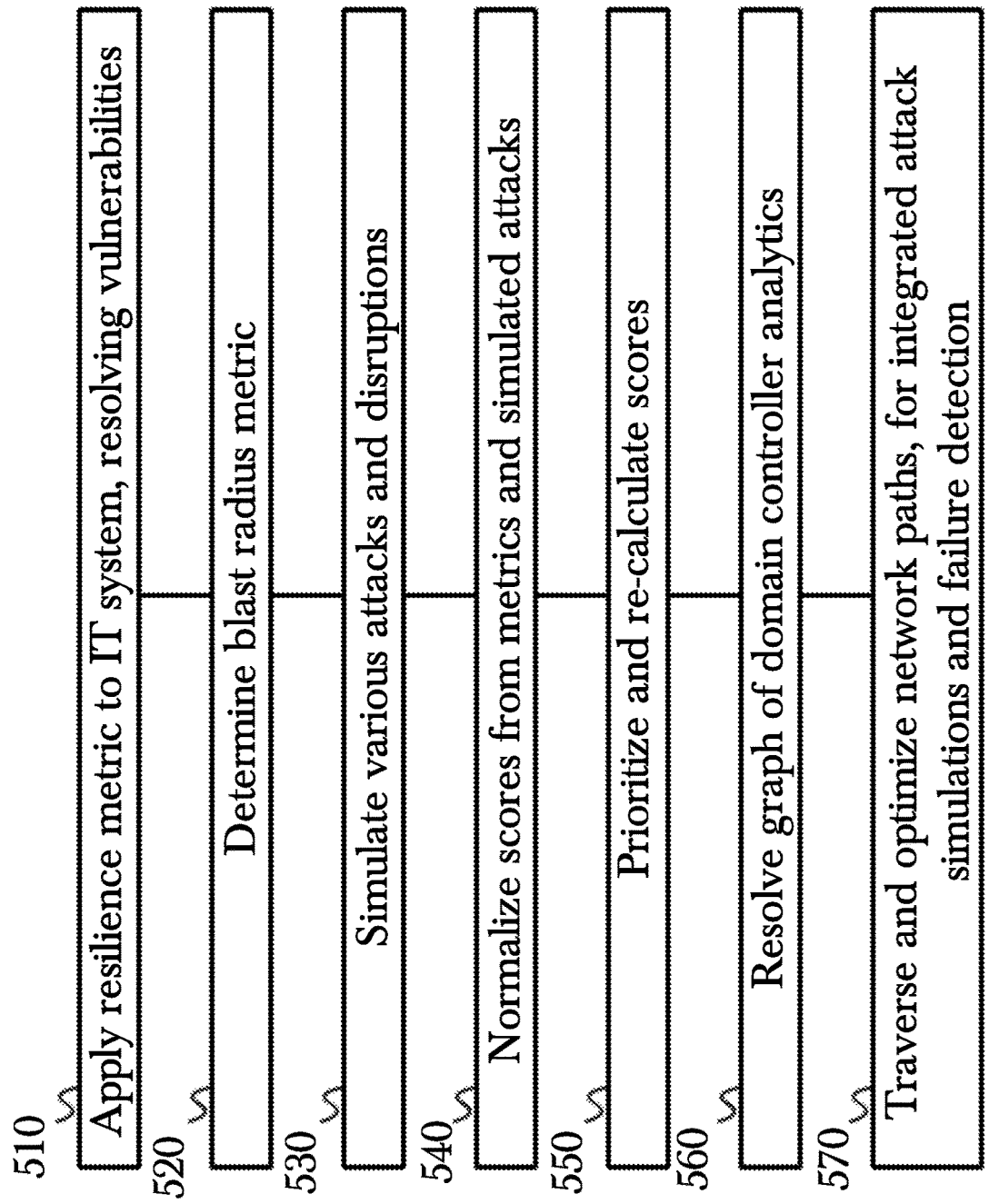
FIG. 5 is a method diagram illustrating steps taken in an IT tracing and analysis system, according to a preferred embodiment.

FIG. 5 is a method diagram illustrating steps taken in an IT tracing and analysis system, according to a preferred embodiment. A resiliency metric is applied to the system 510, which resolves vulnerabilities into vertices which may be evaluated independently and in relation to each other. A graph may be constructed for this purpose which may represent, for example, user groups on devices, devices themselves, and users, to determine the relationships and capabilities of the vertices on each other, to resolve criticality ratings on each of them and determine their relationship. A blast radius metric is determined 520, which calculates, based on the resolved vertices 510, the "blast radius" of a vulnerability being exploited or a directed attack on a specific vertex of the resilience metric 510. After a blast radius metric is graphed for various vertices and attack methods 520, varying attacks and exploits are simulated 530 within the system. For example, using the simulative system, a user may be connected to two devices in a network, and belong to a user group which is also connected to the two devices, meaning it is active and enabled on the devices. The user may be simulated 530 as having a password that is vulnerable to a password attack, allowing access to two devices with a user belonging to a given user group, which may be calculated as a specific numeric value for a blast radius metric based on the devices and user group permissions in question. In this sense, the "blast radius" of the user's password and identity being compromised may be these systems with this user group. After metrics 510, 520 and attack simulations 530 are complete, scores are normalized 540 according to desired settings and simulation results. For example, a Monte-Carlo tree search optimization-based heuristic may be used to determine the worst-scoring topology between related vertices, and using this worst-case score, a calculation can be performed to develop a blast-radius metric for the IT infrastructure in question. The equation takes the form of $$v_s = \frac{100(w - v)}{w},$$

where "w" is the worst-case score of the metric for the network, "v" is the metric value for the network itself, and "$v_s$" is the scale score, the normalized value to represent the overall resilience metric for the network topology 540. The scores generated, and the generation process, can be fine-tuned according to user settings specified in the system, and may be re-calculated based on new events generated in the system 550, such as a new attack vector being discovered and implemented, or a new device, user, or other vertex being added to the system for analysis. A domain controller (DC) such as ACTIVE DIRECTORY™ may be resolved as a separate graph 560, analyzing the connections of the domain controllers and admin connections as separate subgraphs, and running the graphs through the resilience 510 and blast radius 520 metric analyses. Further modeling techniques may be used 570 including parallel traversal of all edges, where the minimum-cost vulnerability pair traversal is computed for each vertex-to-vertex connection; integrated attack simulation, where attacks on various vertices or "nodes" using varying known techniques may be simulated to detect operational failure and determine failure points.

Figure 6:
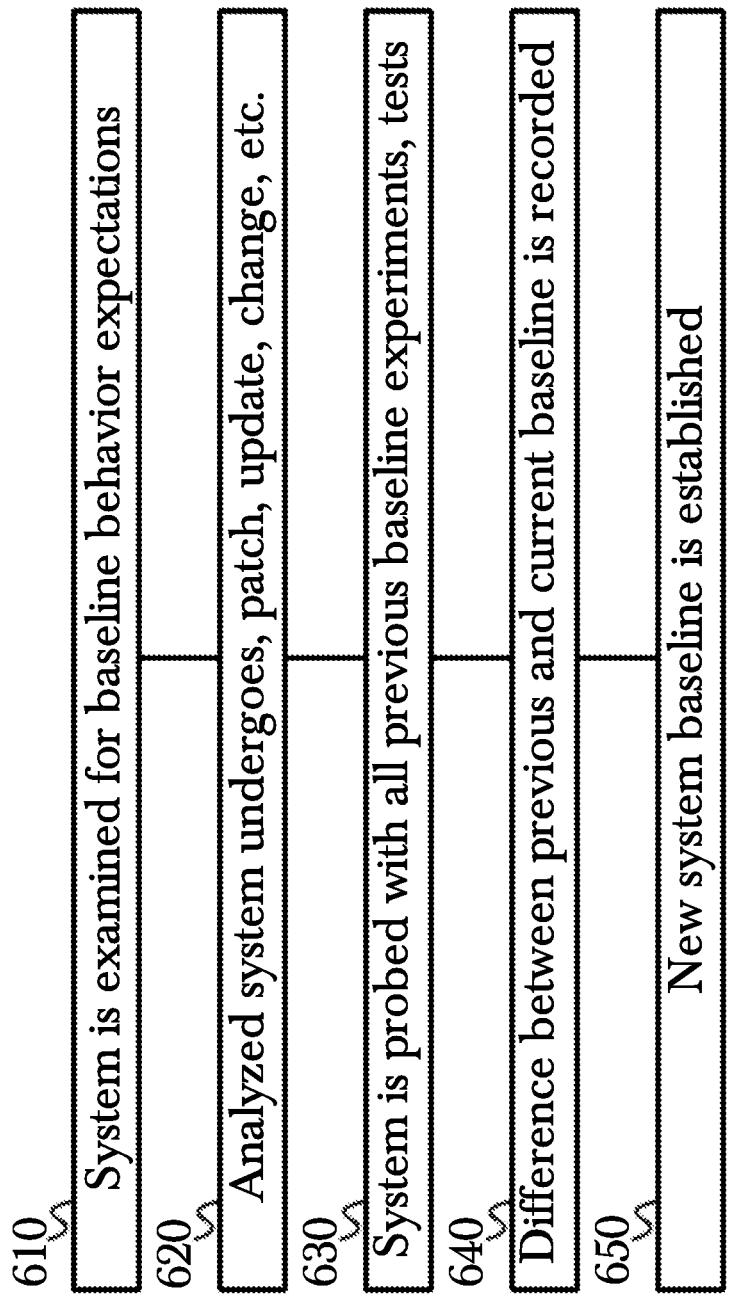
FIG. 6 is a method diagram illustrating testing of system baseline responses to previous analyses and simulations after a patch, update, or other alteration is performed, according to an aspect of a preferred embodiment.

FIG. 6 is a method diagram illustrating testing of system baseline responses to previous analyses and simulations after a patch, update, or other alteration is performed, according to a preferred aspect. According to the aspect, a system may be inspected or analyzed for baseline behaviors 610, for example through applying metrics 510, 520 to a network and device topology, establishing baseline responses to various simulated attacks and situations 530, 570. However, systems are updated, altered, and changed quite frequently in the IT world, and when this happens 620, simulations, tests, and metrics may be re-simulated and re-generated 630 in order to regenerate a system baseline of behavior, recording the differences between changed behaviors, altered metrics, any completely new behaviors or metrics which may be especially relevant if new vertices are added to a system, and the former baseline results of the system in these categories 640. A new baseline of system behavior is established 650 which can further allow for system analysis from researchers, operators and administrators, allowing them to investigate and analyze the difference between previous and current system baseline results.

Figure 7:
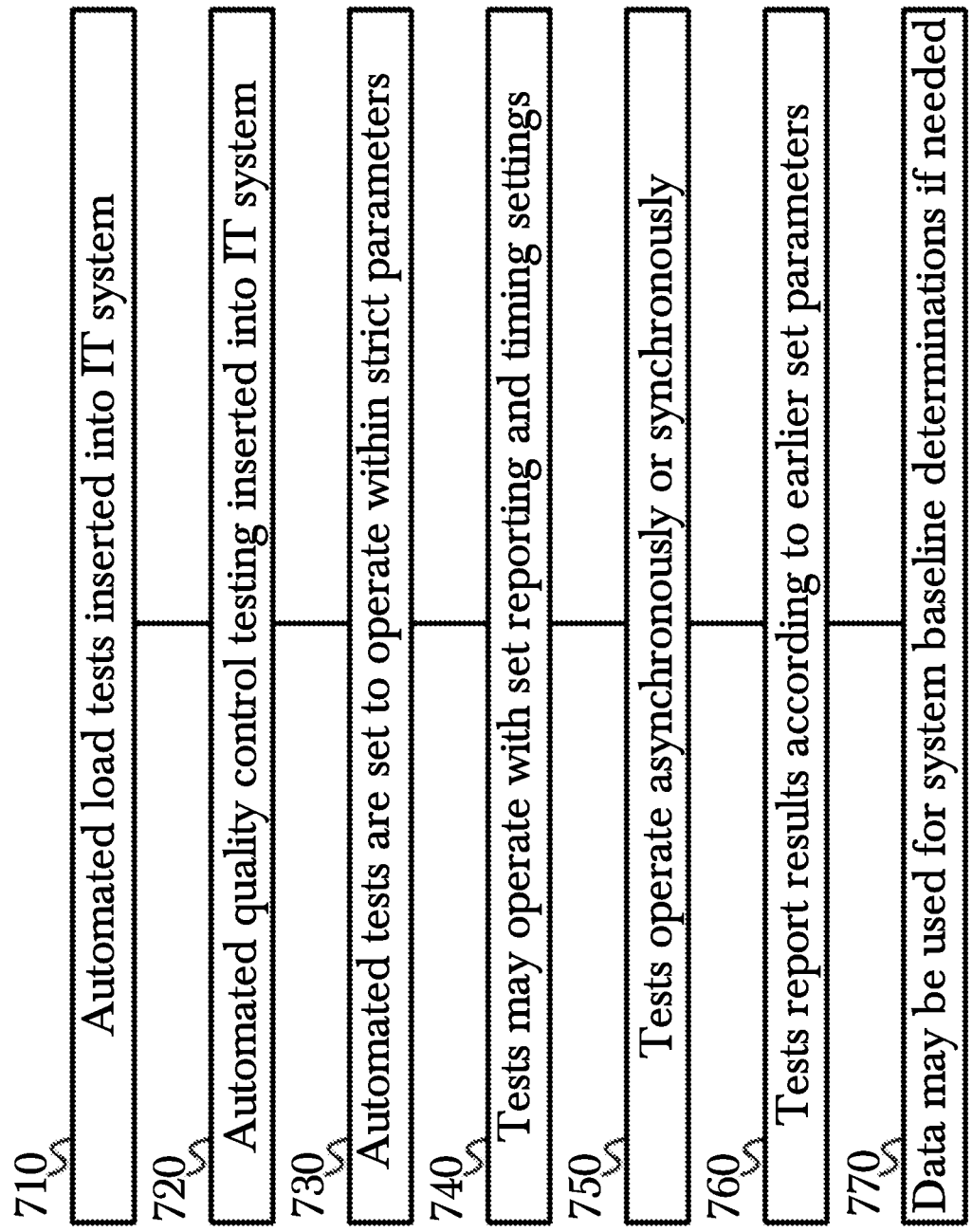
FIG. 7 is a method diagram illustrating the insertion and use of load testing and quality control testing into a production device and being utilized under specific parameters, according to an aspect of a preferred embodiment.

FIG. 7 is a method diagram illustrating the insertion and use of load testing and quality control testing into a production device and being utilized under specific parameters, according to a preferred embodiment. Automated load tests may be inserted into an IT system, from an IT analysis and testing system 710, indicating that the system has been configured to not only perform metric analyses and graph system behaviors 510, 520 in response to attacks 530, but also configured to have load testing simulations performed. Similarly, but not necessarily, quality control testing may be inserted into a system 720, and regardless of which form or both forms of tests are loaded to operate on a system 710, 720, they may be set to operate under specific settings and parameters 730, such as only operating on certain vertices of the system, being set to analyze the results of tests on parallel edges of the vertices of a system, or some other specification provided by a user. These tests may also, separately or together, be configured to operate within specific time constraints, under a set schedule, and with specific reporting mechanisms 740, so as to allow a large degree of customization and utilization from a large number of varied users as required by the industry. These tests may be operated in part or in whole synchronously or asynchronously 750, the advantage of asynchronous testing being that numerous tests may be run at once and not prevent other system functions from operating, however this may be configured to be synchronous or to pause other system functions in the meantime if desired, or to have the tests specifically run sequentially rather than concurrently, as desired. After a test is finished, it may report the results of operation according to the running parameters set beforehand 730, 760. Data from these tests may be used in the generation of a system baseline performance record if need be 770, including a baseline as mentioned in FIG. 6 whereby a system change, update, or other alteration may result in further tests being performed to compared load and quality control testing with the previous baseline before the alterations were made 640.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
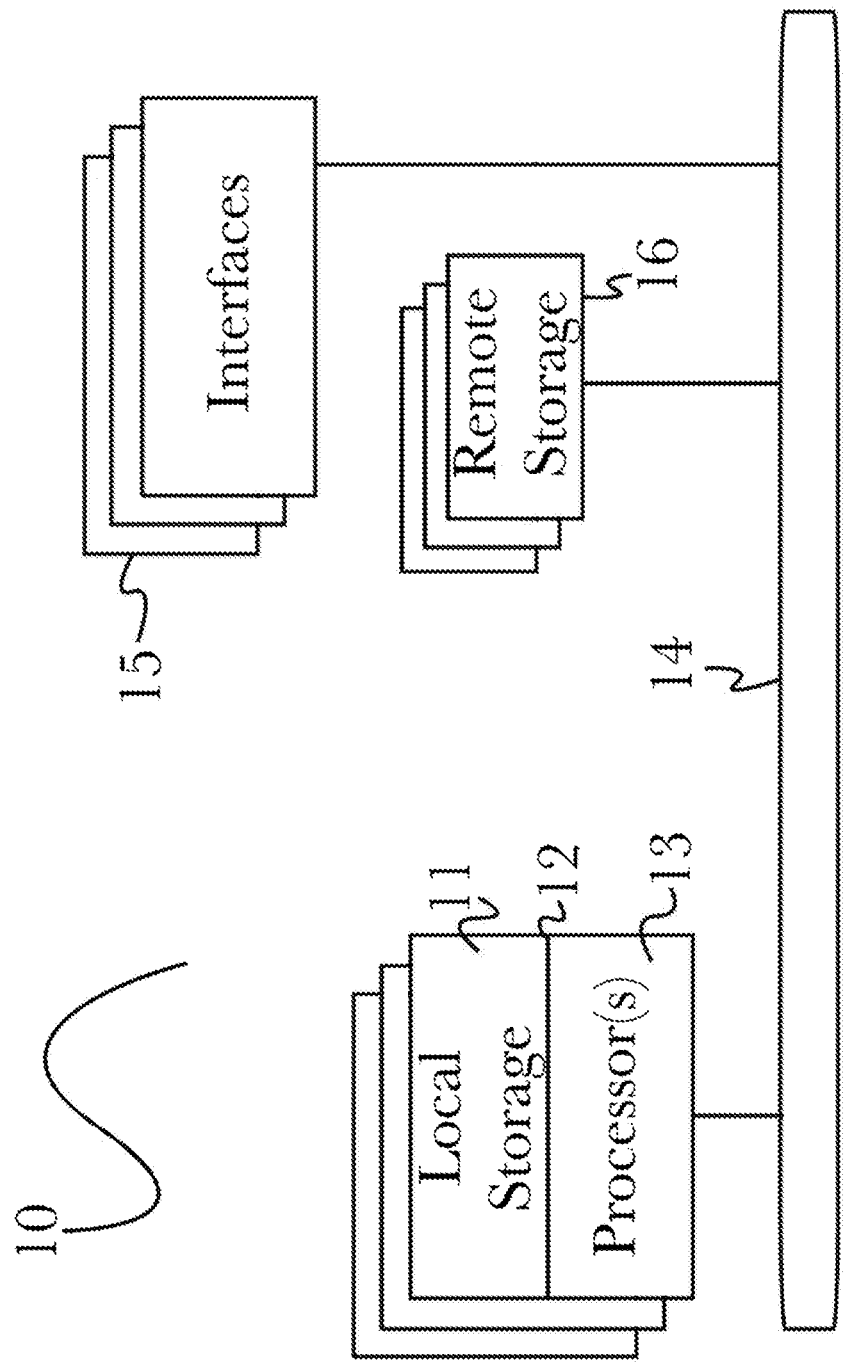
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
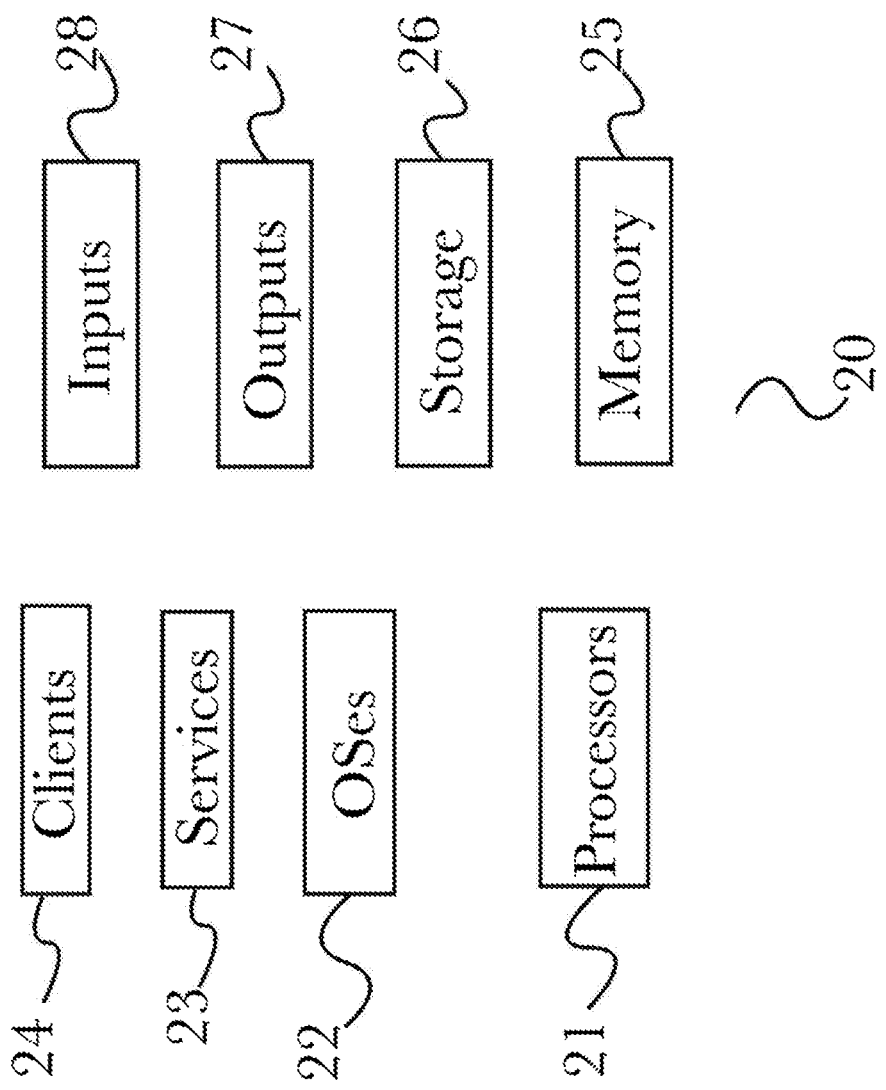
FIG. 9 is a block diagram illustrating an exemplary logical architecture for a client device.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
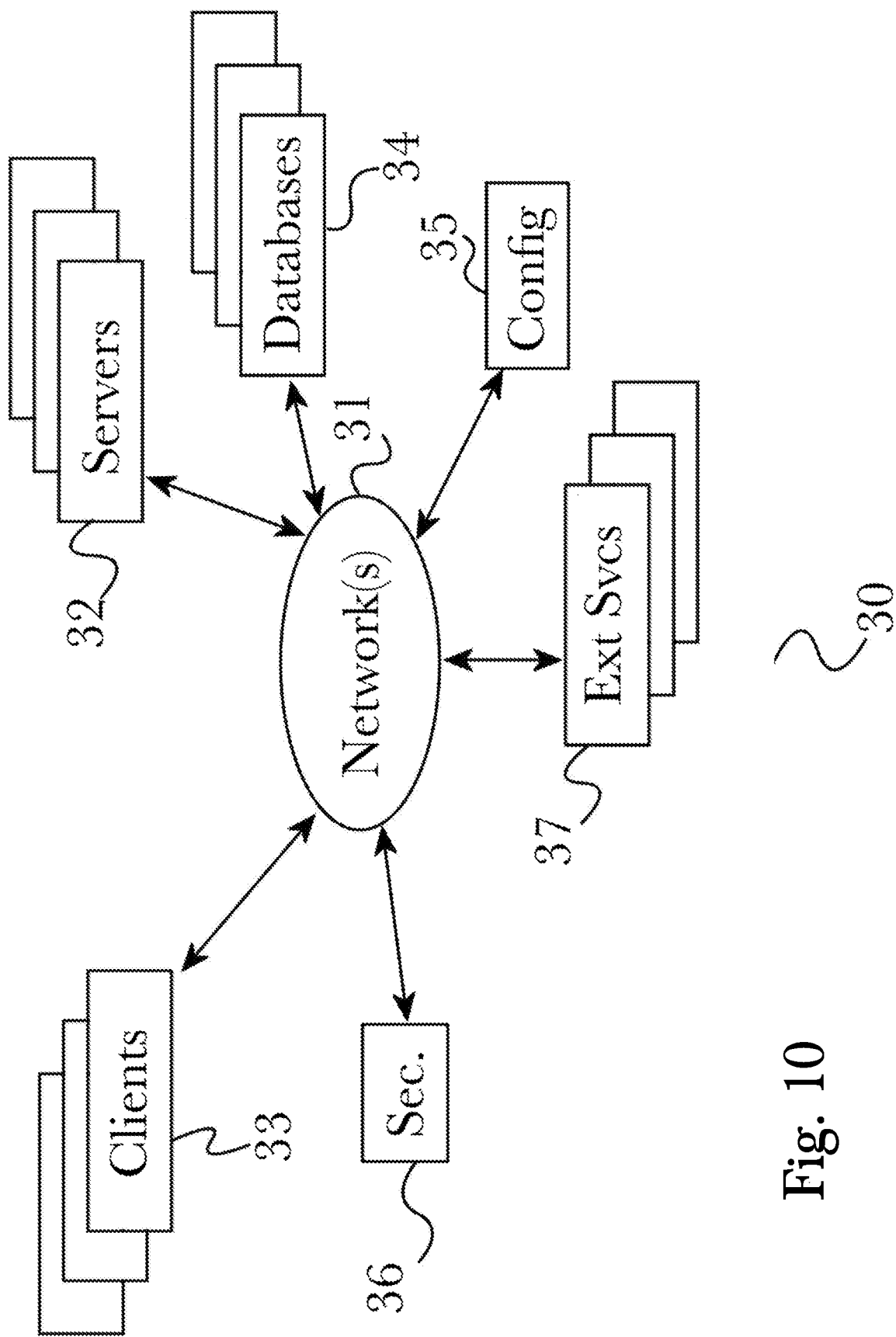
FIG. 10 is a block diagram showing an exemplary architectural arrangement of clients, servers, and external services.

In some embodiments, systems of the present invention may be implemented on a distributed computing network, such as one having any number of clients and/or servers. Referring now to FIG. 10, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 11:
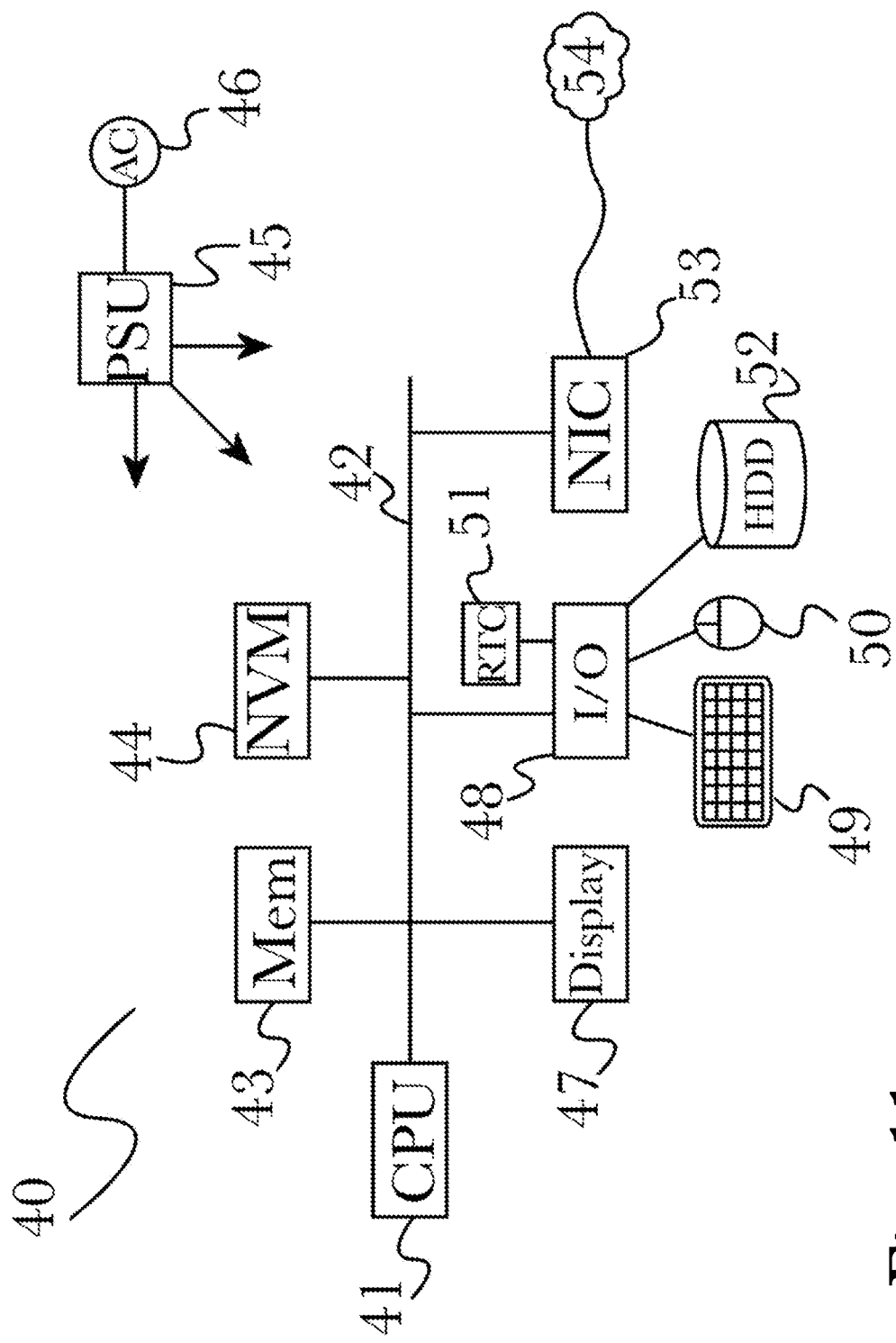
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A computing system for complex IT process annotation and tracing, analysis, and simulation employing a generative simulation platform, the computing system comprising:
one or more hardware processors configured for:
receiving time series data associated with a computer network, the time series data comprising system logs from one or more devices on the computer network;
storing the time series data as a first dataset in a multidimensional time series database;
retrieving the first dataset from the multidimensional time series database;
constructing a knowledge graph from the first dataset by assigning devices, users, user groups, or system properties to nodes and by assigning edges between the nodes representing relationships among the nodes, wherein the knowledge graph is a model of the computer network and its users, and comprises nodes representing devices, users, user groups, or system properties, and vertices representing relationships among the nodes;

selecting a user or user group represented as a node in the directed computational graph;

generating a simulated attack on the model of the computer network by simulating a compromised password of the user or user group;

storing a simulation result, the simulation result comprising a list of nodes accessible using the compromised password;

determining a blast radius comprising an extent to which the computer network would be compromised based on the list of nodes and their relationships to one another;

identifying a plurality of paths between nodes within the blast radius; and calculating and reporting a resilience metric for the computer network, the resilience metric being based on a Monte-Carlo simulation within the blast radius to determine the worst-scoring relationships in the blast radius.

2. A computer-implemented method executed on a generative simulation platform for complex IT process annotation and tracing, analysis, and simulation, the computer-implemented method comprising:

receiving time series data associated with a computer network, the time series data comprising system logs from one or more devices on the computer network;

storing the time series data as a first dataset in a multidimensional time series database;

retrieving the first dataset from the multidimensional time series database;

constructing a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes;

selecting a user or user group represented as a node in the directed computational graph;

generating a simulated attack on the model of the computer network by simulating a compromised password of the user or user group;

storing a simulation result the simulation result comprising a list of nodes accessible using the compromised password;

determining a blast radius comprising an extent to which the computer network would be compromised based on the list of nodes and their relationships to one another;

identifying a plurality of paths between nodes within the blast radius; and calculating and reporting a resilience metric for the computer network, the resilience metric being based on a Monte-Carlo simulation within the blast radius to determine the worst-scoring relationships in the blast radius.

3. A system for complex IT process annotation and tracing, analysis, and simulation employing a generative simulation platform, comprising one or more computers with executable instructions that, when executed, cause the system to:

receive time series data associated with a computer network, the time series data comprising system logs from one or more devices on the computer network;

store the time series data as a first dataset in a multidimensional time series;

retrieve the first dataset from the multidimensional time series database;

construct a directed computational graph from the first dataset by assigning devices, users, user groups, or system properties to nodes and by assigning edges between the nodes representing relationships among the nodes, wherein the directed computational graph coordinates the ongoing curation of a model of the computer network and its users, comprised of nodes representing devices, users, user groups, or system properties, and vertices representing relationships among the nodes;

select a user or user group represented as a node in the graph;

generate a simulated attack on the model of the computer network by simulating a compromised password of the user or user group;

store a simulation result the simulation result comprising a list of nodes accessible using the compromised password;

determine a blast radius comprising an extent to which the computer network would be compromised based on the list of nodes and their relationships to one another;

identify a plurality of paths between nodes within the blast radius; and calculate and report a resilience metric for the computer network, the resilience metric being based on a Monte-Carlo simulation within the blast radius to determine the worst-scoring relationships in the blast radius.

4. Non-transitory, computer-readable storage media having computer-executable instructions embodied thereon that, when executed by one or more processors of a computing system employing a generative simulation platform for complex IT process annotation and tracing, analysis, and simulation, cause the computing system to:

receive time series data associated with a computer network, the time series data comprising system logs from one or more devices on the computer network;

store the time series data as a first dataset in a multidimensional time series;

retrieve the first dataset from the multidimensional time series database;

construct a directed computational graph from the first dataset by assigning devices, users, user groups, or system properties to nodes and by assigning edges between the nodes representing relationships among the nodes, wherein the directed computational graph is a model of the computer network and its users, and comprises nodes representing devices, users, user groups, or system properties, and vertices representing relationships among the nodes;

select a user or user group represented as a node in the directed computational graph;

generate a simulated attack on the model of the computer network by simulating a compromised password of the user or user group;

store a simulation result the simulation result comprising a list of nodes accessible using the compromised password;

determine a blast radius comprising an extent to which the computer network would be compromised based on the list of nodes and their relationships to one another;

identify a plurality of paths between nodes within the blast radius; and calculate and report a resilience metric for the computer network, the resilience metric being based on a Monte-Carlo simulation within the blast radius to determine the worst-scoring relationships in the blast radius.

\* \* \* \* \*